United States Patent
Kim

(10) Patent No.: US 10,421,445 B2
(45) Date of Patent: Sep. 24, 2019

(54) ELECTRIC CALIPER BRAKE

(71) Applicant: MANDO CORPORATION, Pyeongtaek-si, Gyeonggi-do (KR)

(72) Inventor: Ki-Tae Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/812,449

(22) Filed: Nov. 14, 2017

(65) Prior Publication Data
US 2018/0148030 A1    May 31, 2018

(30) Foreign Application Priority Data
Nov. 28, 2016   (KR) .................. 10-2016-0159713

(51) Int. Cl.
*B60T 13/58*    (2006.01)
*B60T 1/06*    (2006.01)
(Continued)

(52) U.S. Cl.
CPC .............. *B60T 13/58* (2013.01); *B60T 1/065* (2013.01); *B60T 13/588* (2013.01);
(Continued)

(58) Field of Classification Search
CPC ...... B60T 13/58; B60T 2125/40; B60T 1/065; F16D 55/225; F16D 2123/00; F16D 2125/40; F16D 65/18
See application file for complete search history.

(56) References Cited

U.S. PATENT DOCUMENTS 3,920,103 A * 11/1975 Haraikawa .............. F16D 65/18
188/196 D
4,053,031 A * 10/1977 Thioux ................. F16D 55/224
188/71.9

(Continued)

FOREIGN PATENT DOCUMENTS

CN    1936356 A    3/2007
CN    101003273 A    7/2007
(Continued)

OTHER PUBLICATIONS

Chinese Office Action dated Mar. 2, 2019 issued in Chinese Patent Application No. 201711215371.1.

*Primary Examiner* — Xuan Lan Nguyen
(74) *Attorney, Agent, or Firm* — Morgan, Lewis & Bockius LLP

(57) ABSTRACT

According to an aspect of the present disclosure, there is provided an electric caliper brake including a carrier at which a pair of pad plates are installed to be movable forward and backward, and a caliper housing slidably installed at the carrier and provided with a cylinder in which a piston having a concave cup-shaped interior is installed to be movable forward and backward by a braking hydraulic pressure, the electric caliper brake comprising: a power converter provided with a spindle member installed to pass through a rear portion of the cylinder and rotated by receiving a rotational force from an actuator, and a nut member configured with a rod screw-coupled to the spindle member and disposed inside the piston and a head portion formed to extend from the rod in a radial direction to be in contact with the piston; and a blocking member having one end installed at the piston and the other end installed at the rod and configured to seal an inner space of the piston.

8 Claims, 4 Drawing Sheets

(51) Int. Cl.
*F16D 55/225* (2006.01)
*F16D 65/18* (2006.01)
*B60T 13/74* (2006.01)
*F16D 55/226* (2006.01)
*F16D 121/04* (2012.01)
*F16D 121/24* (2012.01)
*F16D 123/00* (2012.01)
*F16D 125/40* (2012.01)

(52) U.S. Cl.
CPC .......... *B60T 13/741* (2013.01); *F16D 55/225* (2013.01); *F16D 55/226* (2013.01); *F16D 65/18* (2013.01); *F16D 65/183* (2013.01); *F16D 2121/04* (2013.01); *F16D 2121/24* (2013.01); *F16D 2123/00* (2013.01); *F16D 2125/40* (2013.01)

(56) References Cited

U.S. PATENT DOCUMENTS

| | | | | |
|---|---|---|---|---|
| 4,246,985 A | * | 1/1981 | Shimizu | F16D 65/18 188/196 D |
| 4,355,708 A | * | 10/1982 | Papagni | F16D 65/567 188/196 D |
| 5,038,895 A | * | 8/1991 | Evans | F16D 65/567 188/106 F |
| 8,322,495 B2 | | 12/2012 | Leiter et al. | |
| 8,776,958 B2 | * | 7/2014 | Shiraki | B60T 13/741 188/158 |
| 2011/0278107 A1 | * | 11/2011 | Kim | F16D 65/00 188/72.1 |

FOREIGN PATENT DOCUMENTS

| | | |
|---|---|---|
| CN | 102242785 A | 11/2011 |
| CN | 102933866 A | 2/2013 |
| CN | 103443495 A | 12/2013 |
| CN | 104903608 A | 9/2015 |
| JP | 2013-113335 A | 6/2013 |
| JP | 2013113335 A | 6/2013 |
| KR | 20060024913 A | 3/2006 |
| KR | 10-0628354 B1 | 9/2006 |
| KR | 10-2014-0019493 A | 2/2014 |

* cited by examiner

[FIG 1]
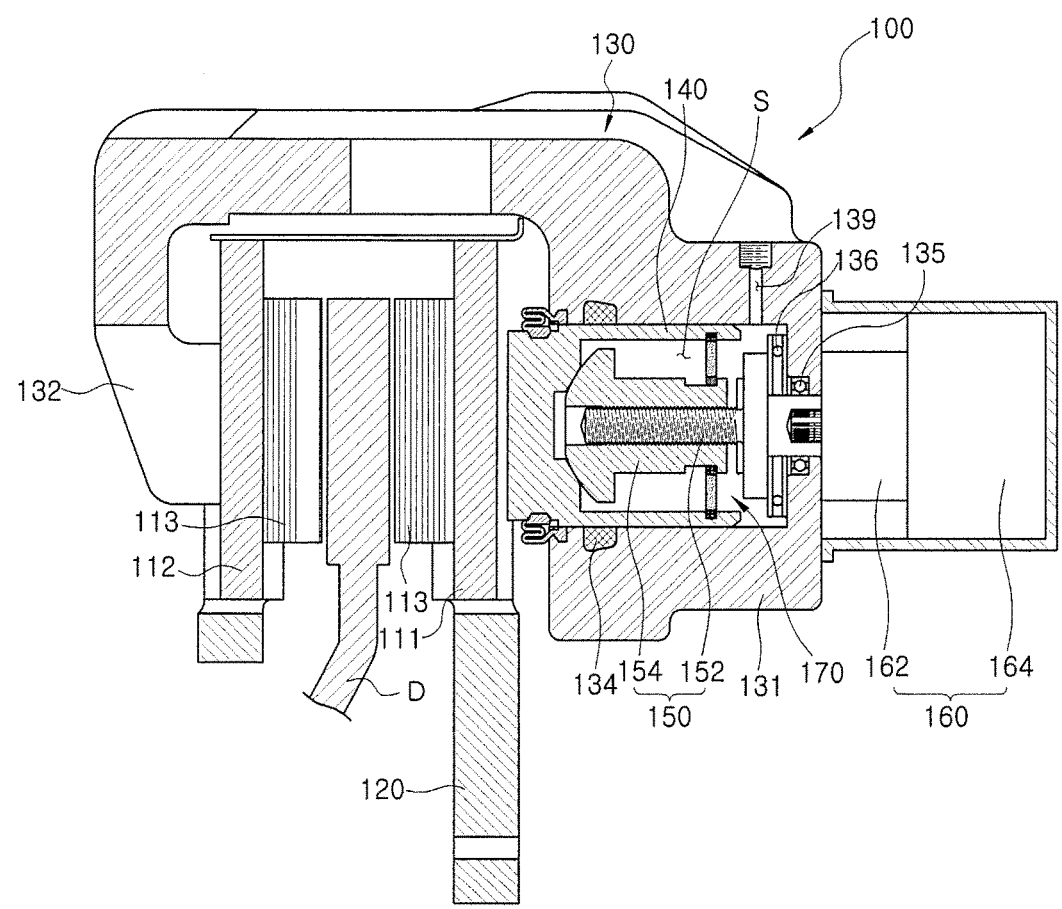

[FIG 2]
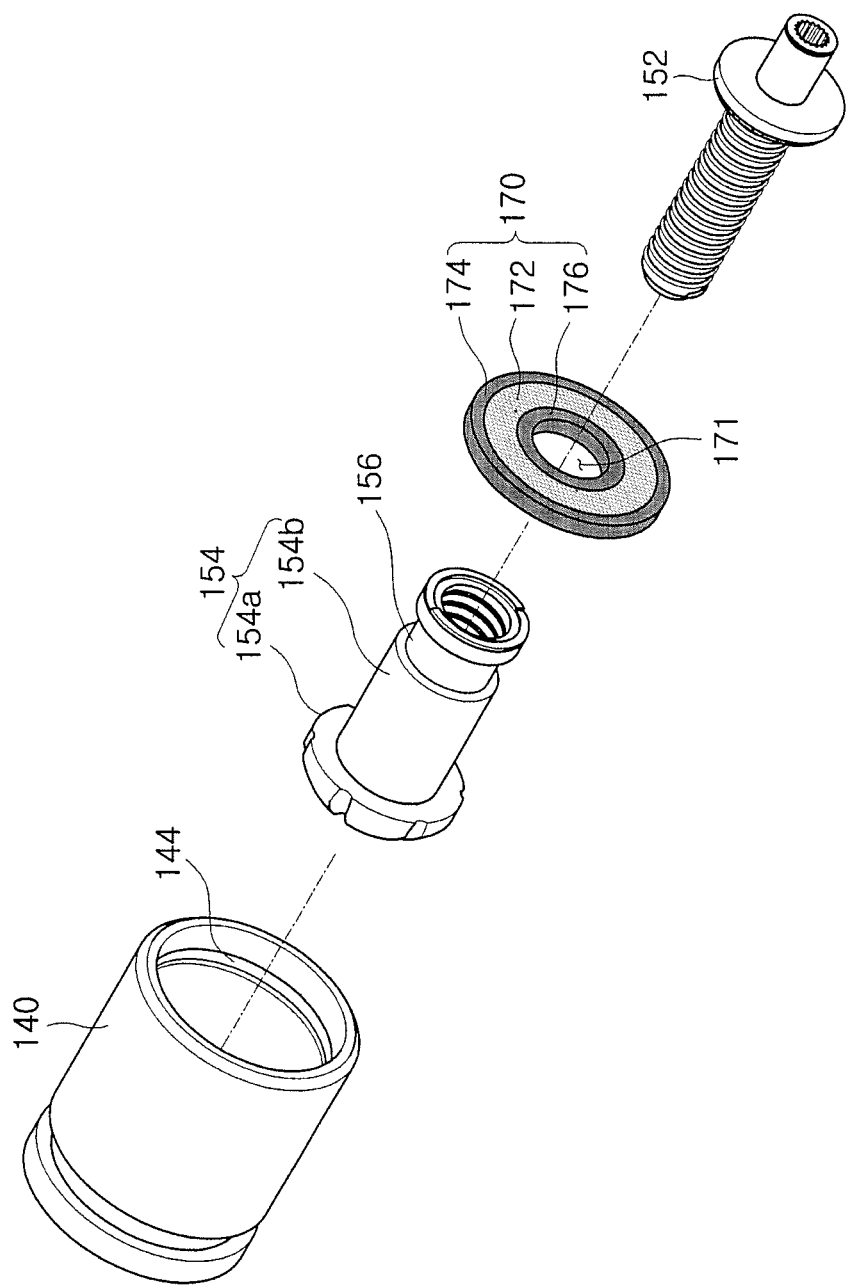

[FIG 3]
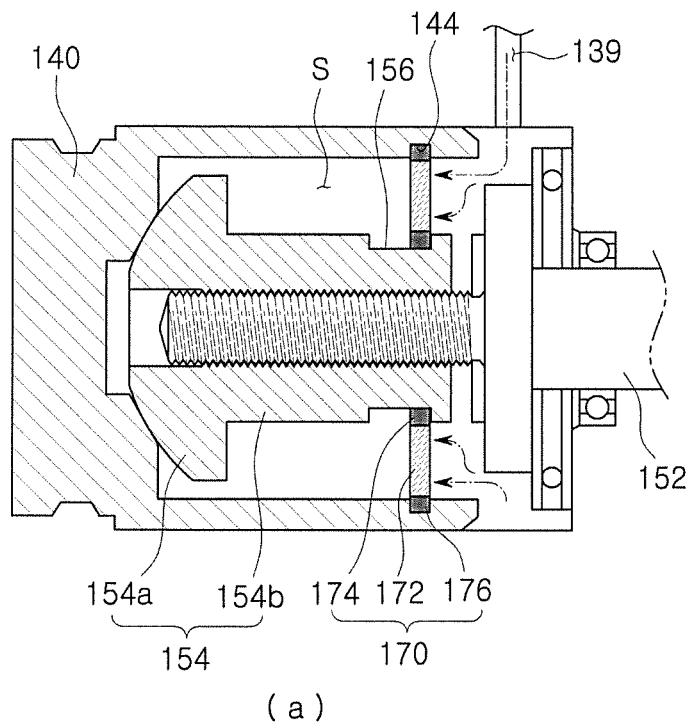
(a)
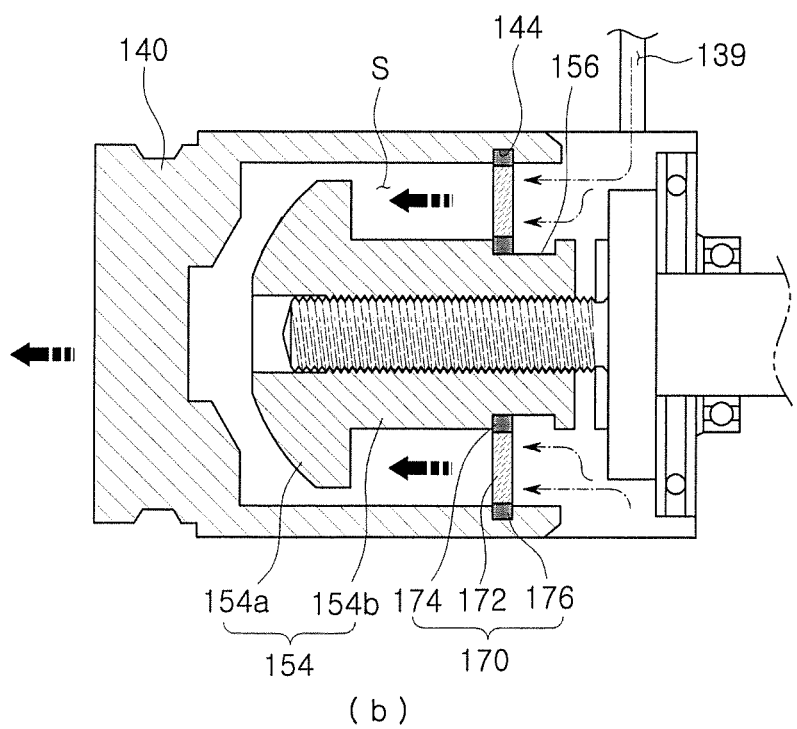
(b)

[FIG 4]
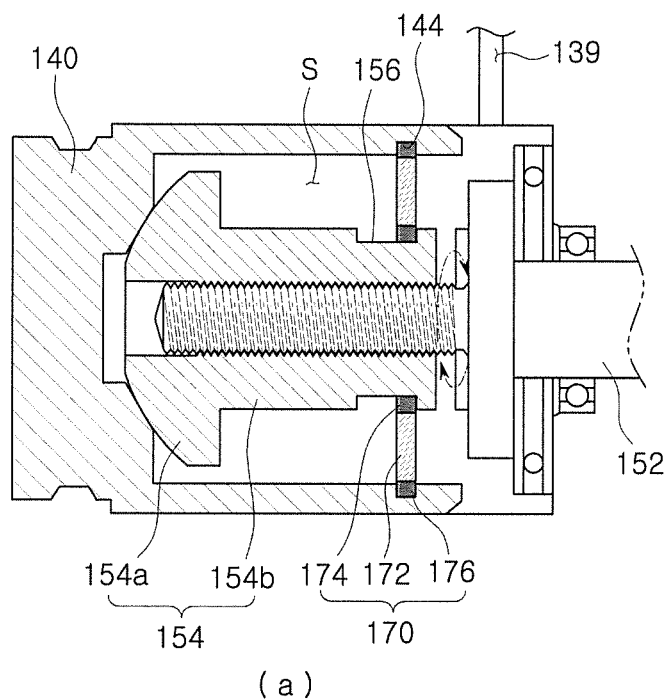
(a)
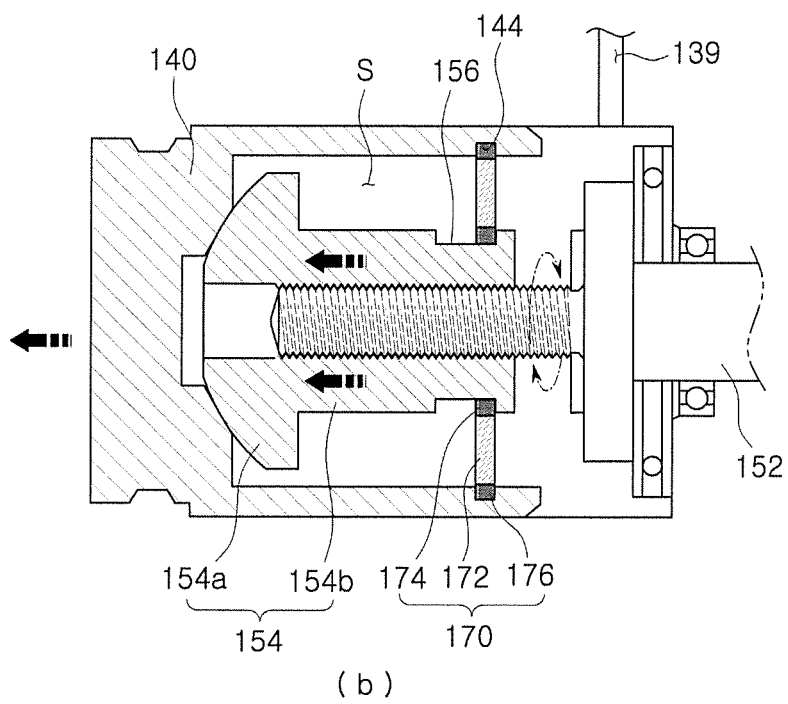
(b)

ELECTRIC CALIPER BRAKE

This application claims the benefit of Korean Patent Application No. 2016-0159713, filed on Nov. 28, 2016 in the Korean Intellectual Property Office, the disclosure of which is incorporated herein by reference.

BACKGROUND

1. Field

Embodiments of the present disclosure relate to an electric caliper brake, and more particularly, to an electric caliper brake capable of improving a pedal feeling by reducing a required fluid amount of brake oil when a braking operation is performed, and reducing a weight of the electric caliper brake by simplifying a structure thereof.

2. Description of the Related Art

Generally, an electric caliper brake is configured such that an actuator operated by electricity is additionally employed in a conventional hydraulic disc brake.

An example of an electric disc brake system (hereinafter, referred to as an electric caliper brake) is disclosed in Korean Registered Patent No. 10-1220294. According to the disclosed document, the electric caliper brake includes a carrier at which a pair of pad plates are provided to be movable forward and backward and are configured to squeeze a disc rotating with a wheel of a vehicle, a caliper housing slidably installed at the carrier and provided with a cylinder in which a piston is installed to be movable forward and backward by a braking hydraulic pressure, a spindle unit configured to pressurize the piston, and a motor and a decelerator which are configured to deliver a rotational force to the spindle unit.

Such an electric caliper brake has a structure for performing a braking operation by pressurizing the piston according to the braking hydraulic pressure or for performing a parking function by pressurizing the piston through the spindle unit which receives the rotational force of the motor and converts a rotational movement into a rectilinear movement.

In the above described electric caliper brake, while the braking operation is performed, a stroke of a brake pedal (that is, a pedal movement distance) is varied according to whether a required fluid amount of brake oil delivered into the cylinder is large or small. That is, the required fluid amount of the brake oil should be reduced to improve a braking feeling when the braking is performed.

However, since the spindle unit is provided inside the piston, a volume inside the cylinder to which the braking hydraulic pressure is supplied is increased in comparison to that inside a conventional hydraulic caliper brake operated by only a hydraulic pressure, and thus the required fluid amount of the brake oil is increased such that there is a problem in that a braking feeling is deteriorated.

To resolve the above described problem, it has been proposed that a filling body be separately provided at a nut member disposed inside the piston to reduce a volume inside the piston. However, since a bulky filling body for filling an inside of the piston is installed therein, a weight of the piston is increased and a large load is applied to the caliper housing such that there is a problem in that deformation of the caliper housing is caused. In addition, there is a problem in that fuel efficiency of a vehicle is adversely affected as the weight is increased.

PRIOR ART DOCUMENT

Patent Document (Patent Document) Korean Registered Patent No. 10-1220294 (Mando Corp.), Jan. 3, 2013.

SUMMARY

Therefore, it is an aspect of the present disclosure to provide an electric caliper brake capable of reducing a required fluid amount of brake oil when a braking operation is performed, and reducing a weight of the electric caliper brake by simplifying a structure thereof.

Additional aspects of the disclosure will be set forth in part in the description which follows and, in part, will be obvious from the description, or may be learned by practice of the disclosure.

According to an aspect of the present disclosure, there is provided an electric caliper brake including a carrier at which a pair of pad plates are installed to be movable forward and backward, and a caliper housing slidably installed at the carrier and provided with a cylinder in which a piston having a concave cup-shaped interior is installed to be movable forward and backward by a braking hydraulic pressure, the electric caliper brake comprising: a power converter provided with a spindle member installed to pass through a rear portion of the cylinder and rotated by receiving a rotational force from an actuator, and a nut member configured with a rod screw-coupled to the spindle member and disposed inside the piston and a head portion formed to extend from the rod in a radial direction to be in contact with the piston; and a blocking member having one end installed at the piston and the other end installed at the rod and configured to seal an inner space of the piston.

Also, a first engagement recess is formed on an inner circumferential surface of the piston to allow the one end of the blocking member to be engaged with the first engagement recess, and a second engagement recess is formed on an outer circumferential surface of the rod to allow the other end of the blocking member to be engaged with the second engagement recess.

Also, the blocking member includes: a body having a center hollow ring shape; a first sealing member formed on an outer circumferential surface of the body and installed at the first engagement recess; and a second sealing member formed on an inner circumferential surface of the body and installed at the second engagement recess.

Also, the body and the first and second sealing members are integrally formed by insert injection.

Also, the body is made of a steel material to have a predetermined rigidity.

Also, the first and second sealing members are each made of an ethylene propylene diene monomer (EPDM).

Also, the second sealing member is formed in a circular shape.

Also, the first engagement recess includes an inclined surface formed in a direction in which the one end of the blocking member is moved.

Also, the second engagement recess is formed to have a predetermined length to allow the blocking member to be moved together with the piston when the piston is moved according to the braking hydraulic pressure and to be slid from the rod.

Also, when the piston is pressurized and released by the nut member being moved forward and backward according to rotation of the spindle member, the blocking member is moved together with the nut member and the piston.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view schematically illustrating an electric caliper brake according to one embodiment of the present disclosure.

FIG. 2 is an exploded perspective view illustrating a coupled state of a piston, a power converter, and a blocking member which are provided in the electric caliper brake.

FIG. 3 is a view showing a state in which an electric caliper brake according to one embodiment of the present invention is operated by braking hydraulic pressure.

FIG. 4 is a view illustrating a state in which an electric caliper brake according to one embodiment of the present invention is actuated by receiving driving force from an actuator.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not shown to clearly describe the present disclosure, and sizes of components may be somewhat exaggerated to facilitate understanding.

FIG. 1 is a cross-sectional view schematically illustrating an electric caliper brake according to one embodiment of the present disclosure, and FIG. 2 is an exploded perspective view illustrating a coupled state of a piston, a power converter, and a blocking member which are provided in the electric caliper brake.

Referring to FIGS. 1 and 2, an electric caliper brake 100 according to one aspect of the present disclosure includes a carrier 120 at which a pair of pad plates 111 and 112 are installed to be movable forward and backward to squeeze a disc D rotating with a wheel (not shown) of a vehicle, a caliper housing 130 slidably installed at the carrier 120 and provided with a cylinder 131 in which a piston 140 is installed to be movable forward and backward by a braking hydraulic pressure, a power converter 150 configured to pressurize the piston 140, an actuator 160 configured to deliver a rotational force to the power converter 150, and a blocking member 170 configured to seal an inside of the piston 140.

The pair of pad plates 111 and 112 are classified into an inner pad plate 111 disposed to be in contact with the piston 140, and an outer pad plate 112 disposed to be in contact with a finger 132 of the caliper housing 130, which will be described below. The pair of pad plates 111 and 112 are installed at the carrier 120 fixed to a vehicle body to be movable forward and backward toward both sides of the disc D. A friction pad 113 is attached to one surface of each of the pad plates 111 and 112 facing the disc D.

The caliper housing 130 is slidably installed at the carrier 120. More particularly, the power converter 150 is installed at a rear portion of the caliper housing 130, and the caliper housing 130 includes the cylinder 131 in which the piston 140 is provided to be moved forward and backward, and the finger 132 formed at a front portion of the caliper housing 130 and downwardly bent to operate the outer pad plate 112. The finger 132 and the cylinder 131 are integrally formed.

The piston 140 is provided in a cylindrical form having one open side to have a cup-shaped interior, and is slidably inserted into the cylinder 131. At this point, a first engagement recess 144 is formed on an inner circumferential surface of the piston 140. The first engagement recess 144 is formed around the one open side of the piston 140.

One end of the blocking member 170, which will be described below, is engaged with the first engagement recess 144. Accordingly, when the piston 140 is moved, the blocking member 170 is moved together with the piston 140. At this point, the first engagement recess 144 is provided with an inclined surface formed in a direction in which the one end of the blocking member 170 is moved. Thus, the inclined surface is formed to gradually recede from the inner circumferential surface of the piston 140 toward the inside thereof. An operating state of the piston 140 due to the engagement of the first engagement recess 144 and the blocking member 170 will be described again below. The piston 140 pressurizes the inner pad plate 111 toward the disc D by an axial force of the power converter 150 receiving the rotational force of the actuator 160. Accordingly, when a hydraulic pressure for braking is applied to the inside of the cylinder 131, the piston 140 is moved forward to pressurize the inner pad plate 111 and the caliper housing 130 is moved in an opposite direction against the piston 140 by a reaction force, and thus the finger 132 pressurizes the outer pad plate 112 toward the disc D such that braking may be performed.

Meanwhile, an oil port 139 through which brake oil flows is formed at the caliper housing 130 to allow the hydraulic pressure for braking to be applied to the inside of the cylinder 131. A sealing member 134 is provided between an outer surface of the piston 140 and an inner surface of the cylinder 131 to prevent a leakage of the brake oil. The sealing member 134 serves to prevent a leakage of the brake oil flowing into the cylinder 131 and also to return the piston 140 to its original position when a braking operation is released.

The power converter 150 serves to receive the rotational force from the actuator 160, which is configured with a motor 164 and a decelerator 162, to pressurize the piston 140 toward the inner pad plate 111. At this point, various deceleration structures, such as a planetary gear assembly structure, a spur gear assembly structure, a worm and a worm wheel gear assembly structure, and the like, may be employed and used in the decelerator 162, and such deceleration structures are well-known known technologies, and thus a description thereof will be omitted.

More particularly, the power converter 150 is installed and disposed inside the piston 140 and includes a nut member 154 in contact with the piston 140, and a spindle member 152 screw-coupled to the nut member 154.

One side of the spindle member 152 is rotatably installed to pass through the caliper housing 130, that is, the cylinder 131, and the other side thereof is disposed inside the piston 140. At this point, the one side of the spindle member 152 passing through the cylinder 131 is connected to the decelerator 162 to receive the rotational force of the motor 164, and a male screw thread is formed on an outer circumferential surface of the other side of the spindle member 152. A first bearing 135 and a second bearing 136 are installed at mutually spaced positions inside the cylinder 131 to support the spindle member 152. Here, the second bearing 136 is a thrust bearing and receives a reaction force delivered through the spindle member 152 as the nut member 154 is moved forward and backward while the braking operation is performed.

The nut member 154 includes a head 154a inserted into the piston 140 through the open end thereof to be in contact therewith, and a rod 154b extending from the head 154a and having a screw thread which is formed on an inner circumferential surface of the rod 154b and is screw-coupled to the spindle member 152. The head 154a and the rod 154b are integrally formed. Thus, the nut member 154 is screw-coupled to the spindle member 152 and is moved forward and backward according to a rotational direction of the spindle member 152, thereby serving to pressurize and release the piston 140. The nut member 154 should be provided in a rotationally restricted state to be linearly moved according to rotation of the spindle member 152. That is, it should obvious that the piston 140 and the nut member 154 are provided to have protrusions, recesses, or partially flat surfaces to be configured with a structure in which rotation thereof is restricted.

Meanwhile, a second engagement recess 156 is formed on an outer circumferential surface of the rod 154b to be engaged with the blocking member 170, which will be described below. The second engagement recess 156 is formed at a position corresponding to the first engagement recess 144 formed at the piston 140 in a state in which the nut member 154 is disposed inside the piston 140. That is, the second engagement recess 156 is formed around a rear side of the rod 154b. Also, the second engagement recess 156 is formed to have a width that is greater than that of the first engagement recess 144. More particularly, the second engagement recess 156 is formed to have a width that is greater than a thickness of the blocking member 170. This is because the fixed nut member 154 does not restrict the movement of the blocking member 170 when the blocking member 170 is moved together with the piston 140 while the piston 140 is operated by the braking hydraulic pressure. That is, the second engagement recess 156 has a width that is greater than that of the first engagement recess 144 so that, when the piston 140 is maximally pressurized and released to generate a braking force according to the braking hydraulic pressure, an interval of a movement distance of the piston 140 is secured.

One end of the blocking member 170 is installed at the piston 140, and the other end thereof is installed at the rod 154b so that the blocking member 170 serves to seal an inner space S of the piston 140. More particularly, the blocking member 170 includes a center hollow ring-shaped body 172, a first sealing member 174 formed on an outer circumferential surface of the body 172, and a second sealing member 176 formed on an inner circumferential surface of the body 172.

The body 172 is formed in a ring shape having a hollow 171 to allow the rod 154b to pass through the center of the body 172. The body 172 is made of a steel material having a predetermined rigidity to withstand a high pressure of the brake oil flowing inside the cylinder 131. Also, the body 172 is provided such that an inner diameter of the body 172 corresponds to an outer diameter of the rod 154b and an outer diameter of the body 172 corresponds to an inner diameter of the piston 140.

The first sealing member 174 is formed on the outer circumferential surface of the body 172 and is installed at the first engagement recess 144. A thickness of the first sealing member 174 is provided to correspond to the width of the first engagement recess 144 and is tightly engaged with the first engagement recess 144. Accordingly, the first sealing member 174 prevents a leakage of the brake oil between the piston 140 and an outer circumferential surface of the blocking member 170. Also, since the first sealing member 174 is installed to be in close contact with and fixed to the first engagement recess 144, the blocking member 170 is moved together with the piston 140 when the piston 140 is moved.

The second sealing member 176 is formed on the inner circumferential surface of the body 172 and is installed at the second engagement recess 156. A thickness of the second sealing member 176 is provided to be less than the width of the second engagement recess 156. That is, the second sealing member 176 is in close vertical contact with the rod 154b to prevent a leakage of the brake oil between the rod 154b and the blocking member 170. Also, the second sealing member 176 is slid from the second engagement recess 156 in a horizontal direction, that is, in a width direction thereof, when the piston 140 is moved according to the braking hydraulic pressure. At this point, the second sealing member 176 is provided in a circular shape. That is, the second sealing member 176 is in point or line contact with the second engagement recess 156 while being moved to reduce a friction force.

The first and second sealing members 174 and 176 are each made of an ethylene propylene diene monomer (EPDM) to prevent a leakage of the brake oil between the piston 140 and the rod 154b.

Next, a state in which the electric caliper brake 100 is operated by the braking hydraulic pressure will be described with reference to FIGS. 1 and 3.

When a brake oil flows into the oil port 139 formed at the caliper housing 130, a pressure is applied to the piston 140 and the blocking member 170, which is installed between the piston 140 and the rod 154b, so that the piston 140 and the blocking member 170 are pressurized. Thus, the piston 140 is moved forward to pressurize the inner pad plate 111 toward the disc D. Also, the blocking member 170 fixedly engaged with the first engagement recess 144 and is moved together with the piston 140 while the piston 140 is moved. At this point, since the thickness of the blocking member 170 is less than the width of the second engagement recess 156, the blocking member 170 is slid from the second engagement recess 156.

The blocking member 170 is slid from the second engagement recess 156 while the piston 140 returns to its original position after the braking is completed and returns to its original position together with the piston 140.

Next, a state in which the electric caliper brake 100 is operated by receiving a driving force from the actuator 160 will be described with reference to FIGS. 1 and 4.

When a rotational force is delivered to the spindle member 152 through the motor 164 and the decelerator 162 of the actuator 160 and thus the spindle member 152 is rotated, the nut member 154 is moved forward to pressurize the piston 140 toward the inner pad plate 111. Accordingly, the blocking member 170 is moved together with the piston 140 according to a movement of the piston 140, and the blocking member 170 is also moved by being supported on a distal end of one side of the second engagement recess 156 of the nut member 154. That is, when the piston 140 is pressurized through the nut member 154, the blocking member 170 is moved together with the piston 140 and the nut member 154.

When the nut member 154 returns to its original position after braking for parking is completed, the blocking member 170 is moved to return to its original position together with the nut member 154 and the piston 140.

Consequently, the blocking member 170 is installed between the piston 140 and the nut member 154 such that the inner space S of the piston 140 can be sealed to minimize an increase in weight of the piston 140 and also the required fluid amount of the brake oil can be reduced, thereby improving a braking feeling.

As should be apparent from the above description, the electric caliper brake according to the embodiments of the present disclosure has an effect of being capable of improving a braking feeling through increasing a pedal effort of a brake pedal by installing a blocking member between a piston and a nut member and sealing an inner space of the piston to reduce a required fluid amount of brake oil.

Further, since the inner space of the piston is formed as an enclosed empty space, there is an effect of being capable of reducing a weight thereof.

In addition, portions of the blocking member configured to seal the inner space of the piston, which are each coupled to the piston and the nut member, are made of a rubber material, and an intermediate portion between the portions thereof is made of a steel material capable of withstanding a high pressure such that a leakage of brake oil can be prevented and also a stable braking operation can be performed.

Additionally, the blocking member is integrally formed by insert injection, and the required fluid amount and the weight can be reduced by installing the blocking member such that ease of assemblability can be ensured.

Although the present disclosure has been described above by way of specific embodiments and the accompanying drawings, the present disclosure is not limited thereto, and it should be understood that numerous other changes and modifications can be devised by those skilled in the art that will fall within the spirit and scope of this disclosure and within the full range of equivalents to which the appended claims are entitled.

What is claimed is:

1. An electric caliper brake including a carrier at which a pair of pad plates are installed to be movable forward and backward, and a caliper housing slidably installed at the carrier and provided with a cylinder in which a piston having a concave cup-shaped interior is installed to be movable forward and backward by a braking hydraulic pressure, the electric caliper brake comprising:
   a power converter provided with a spindle member installed to pass through a rear portion of the cylinder and rotated by receiving a rotational force from an actuator, and a nut member configured with a rod screw-coupled to the spindle member and disposed inside the piston and a head portion formed to extend from the rod in a radial direction to be in contact with the piston; and
   a blocking member having one end installed at the piston and the other end installed at the rod and configured to seal an inner space of the piston,
   wherein:
   a first engagement recess is formed on an inner circumferential surface of the piston to allow the one end of the blocking member to be engaged with the first engagement recess, and
   a second engagement recess is formed on an outer circumferential surface of the rod to allow the other end of the blocking member to be engaged with the second engagement recess.

2. The electric caliper brake of claim 1, wherein the blocking member includes:
   a body having a center hollow ring shape;
   a first sealing member formed on an outer circumferential surface of the body and installed at the first engagement recess; and
   a second sealing member formed on an inner circumferential surface of the body and installed at the second engagement recess.

3. The electric caliper brake of claim 2, wherein the body and the first and second sealing members are integrally formed by insert injection.

4. The electric caliper brake of claim 2, wherein the body is made of a steel material to have a predetermined rigidity.

5. The electric caliper brake of claim 2, wherein the first and second sealing members are each made of an ethylene propylene diene monomer (EPDM).

6. The electric caliper brake of claim 2, wherein the second sealing member is formed in a circular shape.

7. The electric caliper brake of claim 1, wherein the second engagement recess has a predetermined length in a moving direction of the piston to allow the blocking member to move together with the piston when the piston moves by the braking hydraulic pressure and to slide on the outer circumferential surface of the rod.

8. The electric caliper brake of claim 1, wherein, when the piston is pressurized and released by the nut member moving forward and backward according to rotation of the spindle member, the blocking member moves together with the nut member and the piston.

* * * * *